Feb. 15, 1927.

T. J. STURTEVANT 1,617,873

LIQUID MEASURING APPARATUS

Filed Feb. 2, 1922 4 Sheets-Sheet 3

Inventor
Thomas J. Sturtevant
by Henry T. Williams
Attorney

Feb. 15, 1927.

T. J. STURTEVANT 1,617,873

LIQUID MEASURING APPARATUS

Filed Feb. 2, 1922

Inventor
Thomas J. Sturtevant
by Henry T. Williams
Attorney

Patented Feb. 15, 1927.

1,617,873

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

LIQUID-MEASURING APPARATUS.

Application filed February 2, 1922. Serial No. 533,523.

The invention to be hereinafter described relates to apparatus for measuring liquid, and more particularly to apparatus for use in the manufacture of acid phosphate or superphosphate.

In the manufacture of acid phosphate, the ground phosphate rock and acid, such, for example, as sulphuric acid in proper proportions, are thoroughly mixed. The mixture is introduced into a den and allowed to set for a period. Here a chemical action takes place, converting the mixture into acid phosphate. The materials solidify into a mass of sponge-like appearance, which is then broken down into finely flaked form and aerated. Subsequently the material is conveyed to a pit and thence to storage piles, where it remains in readiness for shipment.

For economical, efficient production of acid phosphate of proper quality, it is important that the ground phosphate rock and acid shall be mixed in correct proportions. The aim and purpose of the present invention, therefore, is to provide apparatus for measuring the acid by volume. Successive charges of acid are measured, and may be delivered from the measuring apparatus into a mixer, such, for example, as disclosed in United States Letters Patent No. 1,483,048, granted in my name February 5, 1924, for apparatus for measuring and mixing materials.

The character of the present invention may be best understood by reference to the following description of one good form thereof, shown in the accompanying drawings, wherein.

Figure 1:
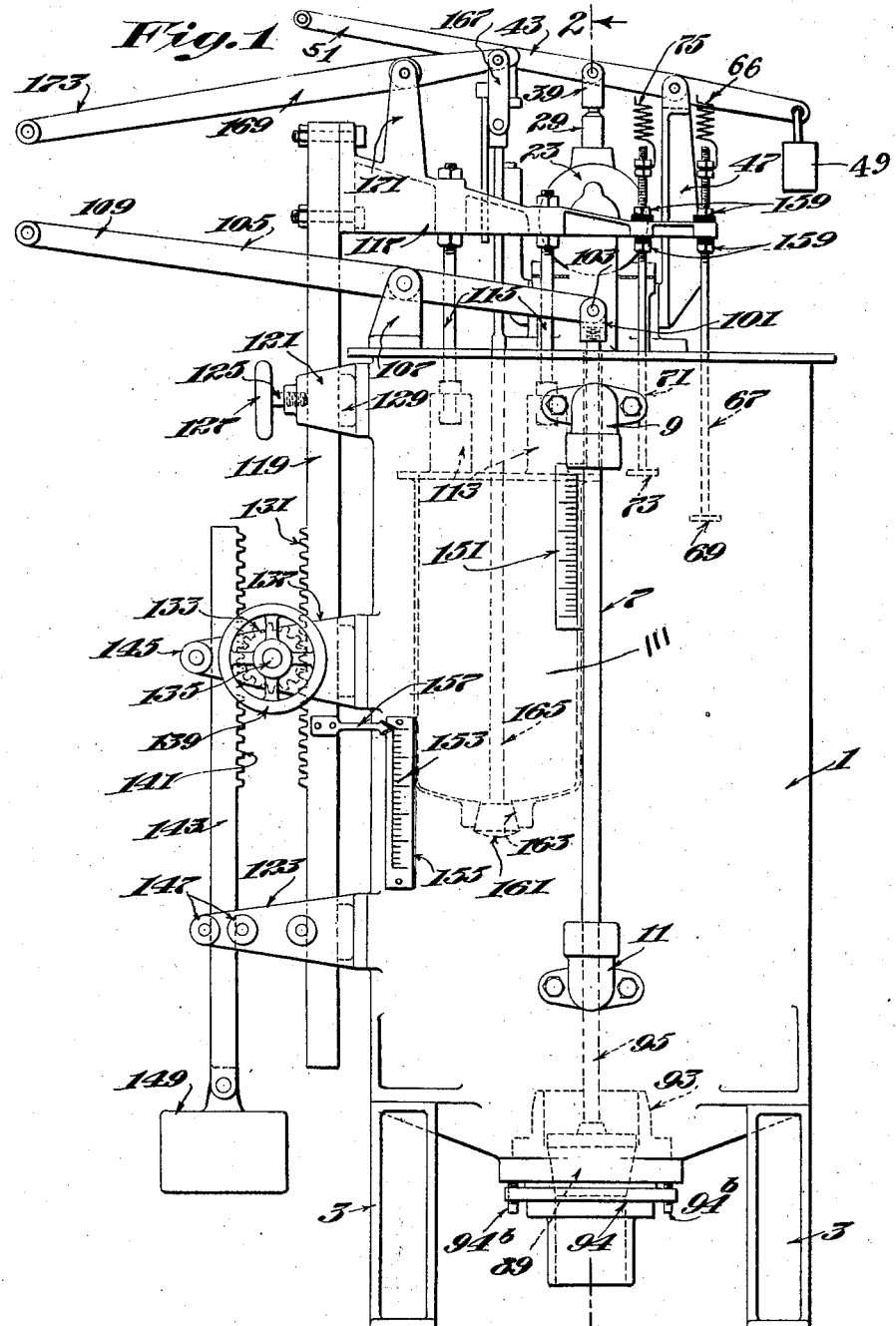
Fig. 1 is a side elevation of the apparatus.
Figure 2:
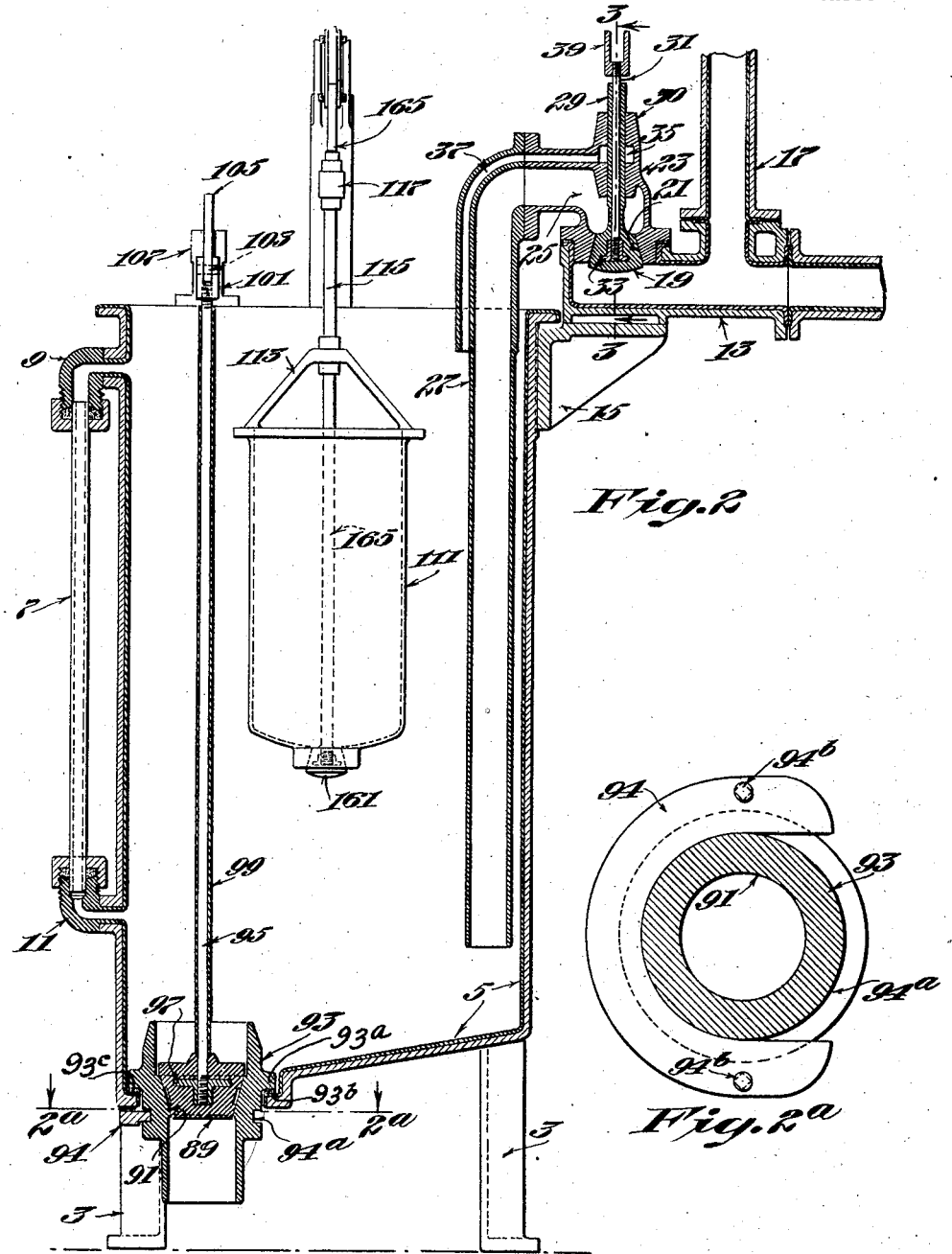
Fig. 2 is a vertical section taken on line 2—2 of Fig. 1.
Figure 3:
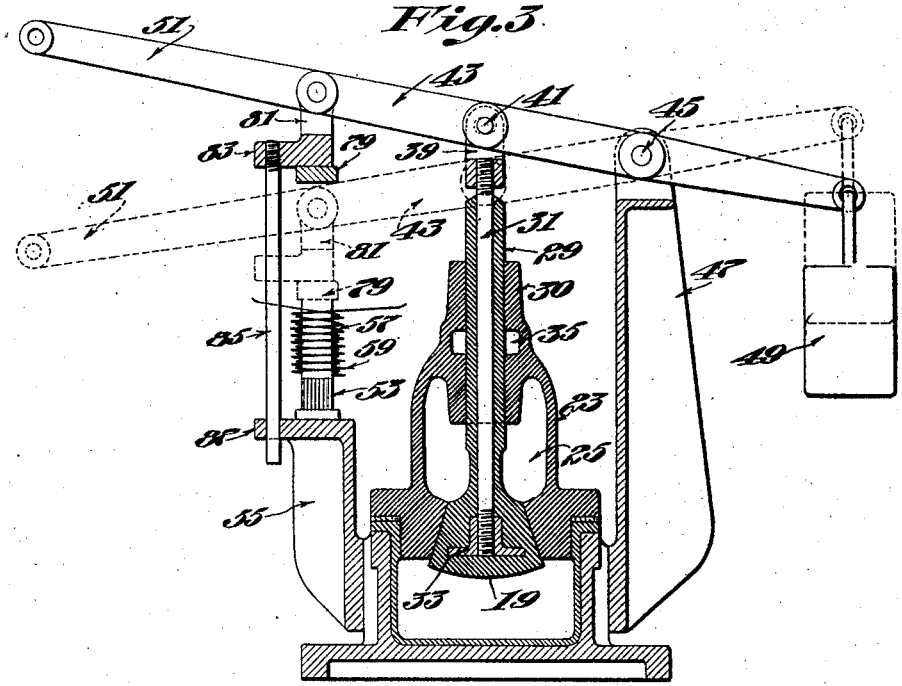
Figure 4:
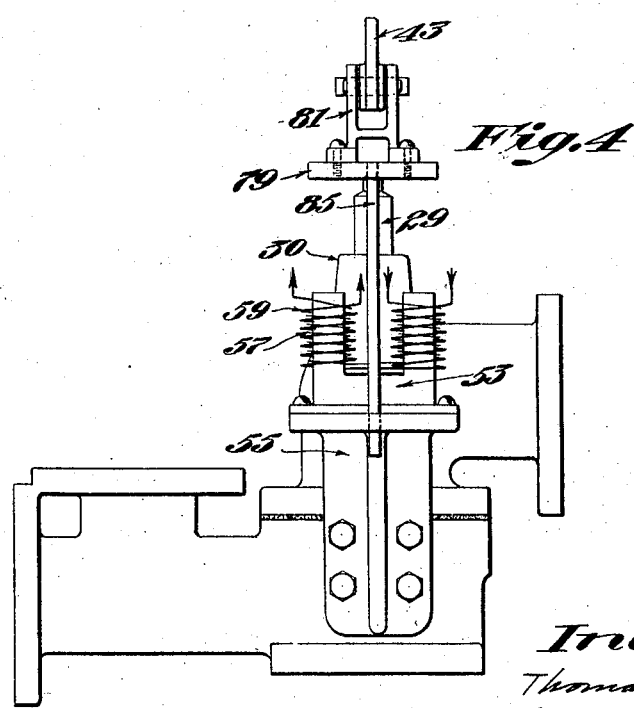
Figure 5:
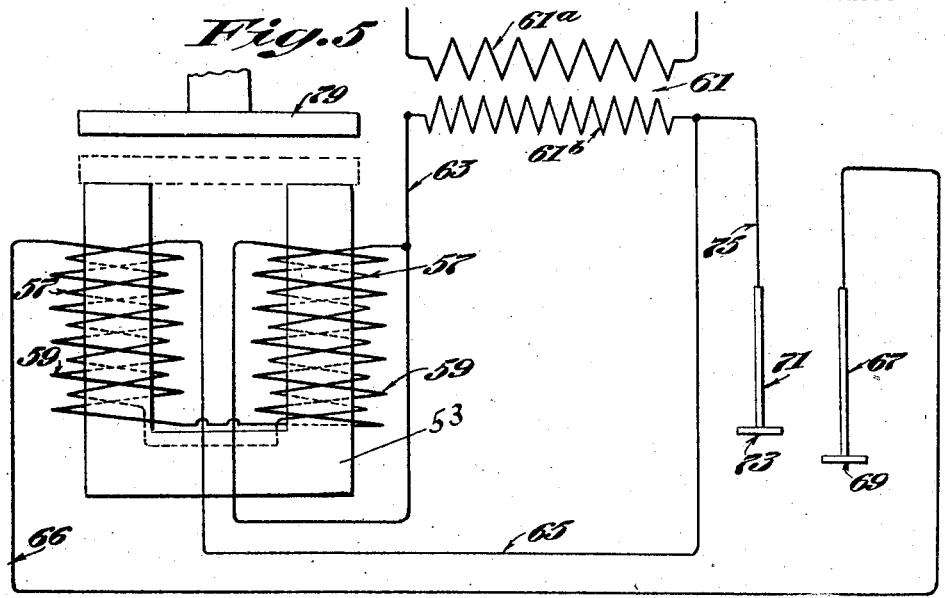
Figure 6:
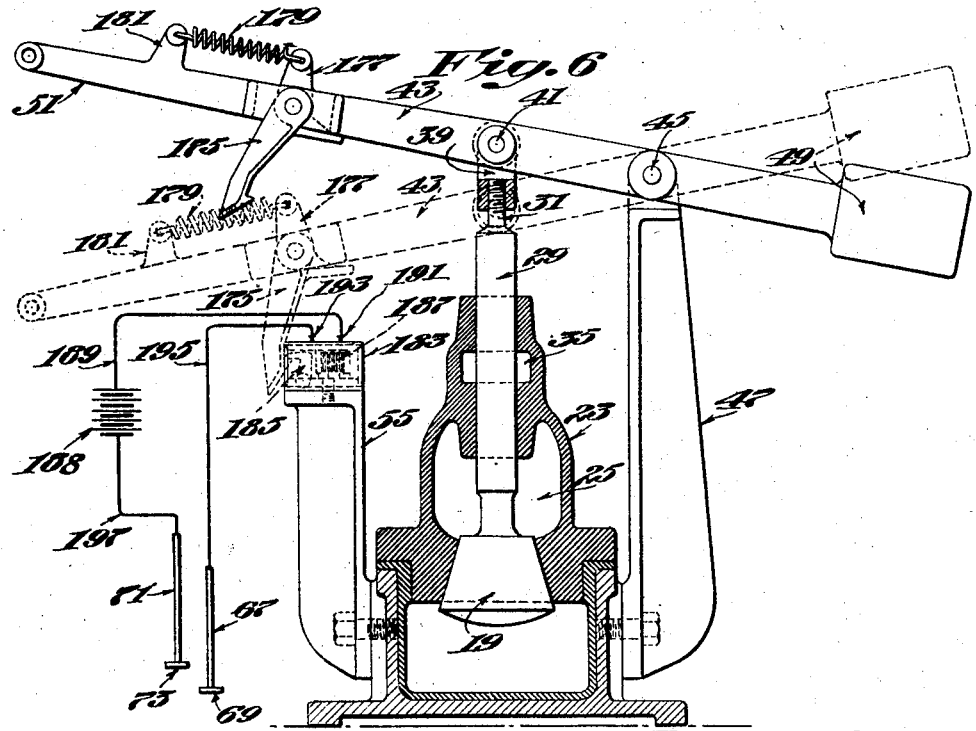

Fig. 2$^a$ is a horizontal section taken on line 2$^a$—2$^a$ of Fig. 2;

Fig. 3 on an enlarged scale is a vertical section disclosing the inlet valve mechanism taken on line 3—3 of Fig. 2;

Fig. 4 is a side elevation of the construction shown in Fig. 3;

Fig. 5 is a diagrammatic view of electrical means for controlling the inlet valve; and Fig. 6 is a vertical section through a modified form of mechanism for controlling the inlet valve.

Referring to the drawings, the apparatus shown therein as one good form of the invention, comprises a container desirably in the form of a tank 1 of general cylindrical form supported by feet 3. The tank is provided with a lining 5 of lead or other suitable material which will not be affected by the acid. At one side of the tank is a glass tube 7 supported by an upper fitting 9 and a lower fitting 11 communicating with the tank, said tube serving as a gage for indicating the level of the liquid in the tank.

The acid may be conducted from a suitable source of supply to the tank through a pipe 13 mounted on a bracket 15 secured to the tank adjacent the upper end thereof. Communicating with the pipe 13 is a vent pipe 17.

Suitable means may be provided for controlling the supply of the acid to the tank. This means, in the present instance of the invention, comprises a valve 19 co-operating with a seat 21 in a fitting 23 containing a chamber 25 in communication with a pipe 27 entered down into the tank and terminating at a point a short distance above the bottom thereof. The valve is formed at the lower end of a tubular stem 29 adapted to slide in a bearing 30 and receiving a rod 31 having its lower end threaded in a head 33 mounted in a recess in the valve.

To prevent any possibility of leakage of acid upward between the stem 29 and the bearing 30, the latter may be formed to present an annular recess 35 communicating with a by-pass port 37 having its lower end in communication with the tank.

The construction is such that if any acid works upward between the valve stem and the bearing, it will enter the recess 35, flow thence through the by-pass port 37 into the tank, and thus will be prevented from escape upward along the stem beyond the upper end of the bearing.

The pipes 13, 17 and 27 may have linings, and the valve, valve stem and the fitting therefor may be of lead or other suitable material which will not be affected by the acid.

The upper end of the valve stem rod 31 may be threaded in a socket in a clevis 39 having a pin 41 connected to a valve operating lever 43 fulcrumed on a pin 45 on a bracket 47 rising from the valve fitting. This lever projects beyond said bracket, and has a weight 49 connected thereto, which tends to rock the lever about the fulcrum pin 45 in a clockwise direction from its position shown in dotted lines to its position shown in full lines in Fig. 3, thereby to pull the valve upward to its seat. The valve operating lever may have an extension 51 serving as a handle to enable the valve to be opened manually in opposition to the weight 49.

It is desirable that after the valve has been opened to admit the acid into the tank, means shall be provided automatically to close the valve after a charge of predetermined volume has entered the tank.

To accomplish this, in the present instance of the invention, a magnet 53 may be mounted on a bracket 55 secured to and projecting upward from the valve fitting. This magnet is provided with a coil 57 and a coil 59, said coils being wound in opposite directions, in order that one may neutralize the magnetic effect of the other, as more fully hereinafter described.

In the present instance an alternating electric current is employed for this magnet and is taken through a transformer 61 having a primary coil 61ª and a secondary coil 61ᵇ. The potential is reduced sufficiently to prevent any possibility of electrolysis or liability of electric shock to the operator coming in contact with the apparatus. Since this transformer is of usual well known construction, it is unnecessary to disclose and describe the same in detail herein.

A conductor 63 leads from the secondary coil of the transformer to the magnet coil 57 and a conductor 65 leads from the magnet coil 57 back to the secondary coil. The consequence is that said magnet coil tends continuously to energize the magnet. One end of the other magnet coil 59 is also connected to the conductor 63 leading from the secondary coil, and the opposite end of the magnet coil 59 is connected by a conductor 66 with a rod 67 projecting down into the tank and having a contact plate 69 at the lower end thereof. Adjacent the rod 67 is another rod 71 having a contact plate 73 at the lower end thereof. The upper end of the rod 71 is connected to a conductor 75 leading to the secondary coil of the transformer.

The construction is such that when the acid in the tank rises to a sufficient height so that the contact plates 69 and 73 are engaged by the acid or immersed therein, the acid will serve as a conductor to convey the current from one of said contact plates to the other, and thereby complete the circuit to the coil 59. The construction is such that the circuit for the magnet coil 57 is continuously completed, whereas, the circuit for the magnet coil 59 is intermittently completed. Cooperating with the magnet is an armature 79 carried by a clevis 81 connected to the valve operating lever 43. To contribute to proper guidance of the clevis and armature in movements of the latter toward and from the magnet, the clevis may be provided with an extension 83, and a rod 85 may have its upper end threaded in said extension, and its lower end entered freely through a hole in an extension on the magnet supporting bracket 55.

When the operating lever 43 is manually rocked in a contraclockwise direction to open the valve, the armature 79 will be brought down into engagement with the magnet. Since the circuit for the magnet coil 57 is always completed, the magnet will hold the armature in this position until the magnetic effect is neutralized by completing the circuit for the coil 59. On the occurrence of this event, the armature will be released from the magnet, and the weight 49 will become effective to rock the valve operating lever 43 in a clockwise direction and snap the inlet valve to its seat.

Suitable means may be provided to allow the measured acid charges to escape from the container. This means, in the present instance, comprises a valve 89 provided with a seat 91 in a fitting 93 having a flange 93ª resting on packing 93ᵇ on a seat 93ᶜ at the bottom of the tank. To press the flange against the seat without the use of screws or bolts exposed to action of the acid in the tank, a U-shaped clamp 94 (Fig. 2ª) may be laterally presented to a circular groove 94ᵇ in the fitting 93, and set screws 94ᵇ may be threaded into said clamp and bear against the under side of the seat. When said screws are tightened, they will press the fitting flange 93ª down into tight engagement with the seat 93ᶜ. The valve is provided with a long stem 95 having its lower end threaded into a head 97 occupying a recess in the valve. The stem may be enclosed in a tube 99 of lead or other suitable material which will not be affected by the acid. The upper end of the stem is threaded in a socket in a clevis 101 having a pin 103 connecting the clevis with a lever 105 pivotally mounted on a bracket 107 mounted on the upper edge of the tank. The lever may be extended outward to present a handle 109.

The construction is such that the lever 109 may be manually rocked to pull the stem upward to open the valve to deliver the charges from the tank as required. On release of the hand lever, the valve will close to its seat under the influence of gravity. The upper surface of the valve is subjected to the pressure of the liquid in the container, which tends to hold the valve down on its seat in closed position.

If greater accuracy in measurement of the acid charges by volume is desired, a container or bucket 111 may be mounted within the tank and be supported at an elevation such that when the charge of the desired volume has flowed into the tank, the surplus will commence to flow over from the tank into the bucket through the open upper end thereof. One of the contact plates, in the present instance, the contact plate 73 may be located at the level of the upper edge of the bucket, so that when the acid commences to flow over into the bucket, the upper contact plate will be engaged by the acid or immersed therein so as to complete the circuit for the magnet coil 59 and thereby neutralize the magnetic effect of the coil 57 and allow the weight 49 to close the inlet valve as described.

The upper end of the bucket may be seen by the operator through the open upper end of the tank, and when the acid commences to flow over into the tank, it will serve as an indication to him that the inlet valve should be closed. He may accomplish this manually by rocking the valve operating lever 43 if desired.

It is desirable that the bucket shall be adjustably supported in the tank, in order that charges of different volumes may be measured. To support the bucket, in the present instance, a pair of handles 113 may be connected to the upper edge thereof, said handles being suspended by hanger rods 115 from an arm 117 extending laterally over the top of the tank. This arm may be carried by a slide bar 119 guided by an upper bracket 121 and a lower bracket 123 projecting laterally from the tank. The slide bar may be held in different positions of adjustment by a holding screw 125 having a hand wheel 127. When the holding screw is tightened, it will press the slide bar between said screw and a block 129.

The slide bar may be provided with a rack 131 meshing with a gear 133 on a stud shaft 135 journalled in a bracket 137, said stud shaft being provided with a hand wheel 139. Also meshing with the gear 133 is a rack 141 on a slide bar 143 extending parallel to the slide bar 119 and guided by a roller 145 on the bracket 137, and a pair of rollers 147 on the bracket 123. Attached to the lower end of the slide bar 143 is a counterbalance weight 149.

The construction is such that when the hand wheel 139 is rotated, it will co-operate with the rack 131 on the slide bar 119 to adjust the bucket to the elevation desired, and this operation will be facilitated by the counterbalance weight 149 operating through the slide bar 143.

To indicate the proper adjustment of the bucket to measure charges of different volumes, the plate 151 may be mounted on the tank adjacent the level indicating gage 7, and said plate may be marked with graduations representing the volume of charges measured in cubical feet. The highest graduation may be at the level of the bucket when the latter is in its highest position of adjustment. The level of the acid standing in the gage glass 7 may be read in connection with the graduations on the scale, and the upper edge of the bucket may be adjusted to a position corresponding to the desired level of the acid standing in the gage.

To facilitate adjustment of the bucket, a second scale 153 may be provided comprising graduations marked on a plate 155 secured to the tank. This scale may be the same as the scale 151, and may be read in connection with a pointer or index 157 secured to the slide bar 119. By reference to the scale 153, the slide bar and bucket may be adjusted to bring the upper edge of the bucket to the proper elevation for measuring charges of the volume indicated by the pointer on the scale.

The rods 67 and 71 referred to, carrying the contact plates 69 and 73, may be conveniently carried by the bucket supporting arm, and said rods may be adjusted relatively to said arm and secured in different positions of adjustment by nuts 159 at opposite sides of said arm. The rods may be insulated from said arm by suitable sleeves of insulation material.

In order that the acid overflowing from the tank into the bucket may be discharged from the latter back into the tank, the bucket may be provided with a valve 161 cooperating with a seat 163 in the bottom of the bucket. A stem 165 has its lower end connected to the valve, and its upper end connected by a link 167 with a lever 169 fulcrumed on a bracket 171 rising from the bucket supporting arm 117. The lever 169 may be projected outwardly to present a handle 173.

After a charge has been delivered from the tank, and the outlet valve 89 has been closed, the bucket valve 161 may be opened, and since the latter is above the bottom of the tank it will allow the acid in the bucket to escape into the tank and contribute to the next charge to be measured in the latter. The bucket may be discharged after each charge has been delivered from the tank, or the bucket can be discharged after overflow has entered the bucket sufficiently nearly to fill the same. When the operator visualizes this condition through the open upper end of the tank and bucket, he can then open the bucket valve to discharge the acid from the bucket into the tank.

When the inlet valve is closed, a small volume of acid will be in the pipes 25 and 27 above the level of the acid in the tank. This increment will flow into the tank and add to the charge therein. To compensate for this increment, the upper contact plate 73 may be lowered somewhat, or a volume equal to that of the increment may be allowed to flow from the tank over into the bucket as desired.

In some instances it may be desirable to provide means positively to hold the inlet valve in its open position, and then automatically release the positive holding means, so that the counterbalance weight 49 may operate through the lever 43 to snap the inlet valve to its seat. To accomplish this, in the present instance, the valve operating lever 43 may be provided with a pawl 175 (Fig. 6) pivotally connected to the actuating lever and having a tail 177. A coil spring 179 has one end connected to the pawl tail, and its opposite end connected to a lug 181 on said lever.

Cooperating with the pawl 175 is a lock 183 comprising a latch 185 controlled by a magnet 187, said latch and magnet being mounted on the bracket 55 in place of the double coil magnet referred to. This latch device may be a usual well known electrically controlled door latch, and therefore, it is unnecessary to show and describe the same in detail herein. A similar electromagnetic latch is disclosed in my copending application above referred to, to which reference may be had.

The current for controlling this latch may be taken from a battery 188 or other suitable source of electricity. A conductor 189 has one end connected to the battery, and its opposite end connected to the binding post 191 on the latch box. A second binding post 193 on the latch box is connected by the conductor 195 to the contact plate rod 67, and the other contact plate rod 71 is connected by a conductor 197 with the battery. The construction is such that when the acid rises in the tank to a sufficient height to reach or submerge both of the contact plates 69 and 73, the magnet circuit will be completed, and the latch 185 will be retracted from the pawl 175 and release the same. Thereupon, the counterbalance weight 49 will become effective to rock the actuating lever 43 in a clockwise direction from its position shown in dotted lines, to its position shown in full lines in Fig. 6, and will snap the inlet valve to its seat. When it is desired to admit the next charge into the tank, the actuating lever 43 is manually rocked in a contra-clockwise direction so as to bring the pawl 175 into interlocking engagement with the lock latch 185.

The operation of the apparatus will be readily understood without further explanation.

By my invention a simple, reliable, efficient apparatus is provided for automatically or manually measuring charges of acid or other liquid by volume.

It will be understood that the invention is not limited to the specific embodiment shown, and that various deviations may be made therefrom without departing from the spirit and scope of the appended claims.

What is claimed is:—

1. Apparatus for measuring liquid, comprising, in combination, a container having an inlet valve operable to admit liquid into said container, a magnet for controlling said valve, an electric circuit including a coil for said magnet and adapted to energize the latter to hold the valve in open position, and a second electric circuit including a coil for said magnet wound oppositely to the first-named coil, and contacts in the second circuit and disposed in said container adapted to be bridged by the liquid on rise of the latter thereto, thereby to complete the second-named circuit and cause the coil thereof to neutralize the effect of the first-named coil and allow closure of said valve to interrupt the supply of liquid to said container.

2. Apparatus for measuring liquid, comprising, in combination, a container having an inlet valve, means tending to close said valve, a magnet for controlling said valve, an electric circuit including a coil for said magnet and continuously closed to tend to hold the valve in open position, a second electric circuit including a coil for said magnet wound oppositely to the first-named coil, and contacts in the second circuit and disposed in said container and bridged by the liquid on rise of the latter to said contacts to complete the second circuit and cause the coil of the latter to neutralize the effect of the first-named coil, thereby to allow the means tending to close said valve to snap the latter to closed position.

3. Apparatus for measuring liquid, comprising, in combination, a container for measuring successive charges of liquid by volume, inlet and outlet valves for said container, a receiver mounted in said container having an opening to allow liquid to flow from said container into said receiver on rise of the liquid to said opening, a magnet for holding said inlet valve in open position, an electric circuit for said magnet having contacts in said container adapted to be bridged by the liquid on rise of the latter to said contacts, one of the latter being disposed at the level of the receiver opening, that said magnet circuit may be completed when the liquid commences to flow from the container into the receiver opening.

4. Apparatus for measuring liquid, comprising, in combination, a container for measuring successive charges of liquid by volume, inlet and outlet valves for said container, a receiver mounted in said container at a predetermined elevation and having an open end to allow the liquid to flow from the container through said open end into the receiver, a discharge valve for said receiver, means tending to close said inlet valve, a magnet, an electric circuit for said magnet including a coil for energizing said magnet to hold said inlet valve in open position, and an electric circuit including a coil for said magnet wound oppositely to said first-named coil, said second circuit having contacts disposed in said container and bridged by the liquid on rise of the latter to said contacts, one of said contacts being disposed substantially at the level of the open end of the receiver, that the second circuit may be closed to deenergize the magnet when the liquid commences to flow from the container into the open end of the receiver.

5. Apparatus for measuring liquid, comprising, in combination, a container for measuring successive charges of liquid by volume, inlet and outlet valves for said container, a receiver mounted at a predetermined elevation in said container and having an opening to allow liquid to flow from said container into said opening on rise of the liquid to the level of said opening, thereby to determine the volume of the charge, and means to vary the elevation of said receiver and thereby vary the volume of the charge.

6. Apparatus for measuring liquid, comprising, in combination, a container for measuring successive charges of liquid by volume, inlet and outlet valves for said container, a receiver, means adjustably to support said receiver at predetermined elevations, said receiver having an opening to allow liquid to flow from said container into said receiver on rise of the liquid to the level of said opening, and means for indicating the elevation adjustment of said receiver.

7. Apparatus for measuring liquid, comprising, in combination, a container for measuring successive charges of liquid by volume, inlet and outlet valves for said container, a receiver in said container having an opening to allow liquid to overflow from said container into said receiver on rise of the liquid to the level of said opening, and a carrier for adjustably supporting said receiver provided with means to counter-balance the weight of the receiver.

8. Apparatus for measuring liquid, comprising, in combination, a container for measuring successive charges of liquid by volume, inlet and outlet valves for said container, a receiver in said container having an opening to allow liquid to overflow from said container into said receiver on rise of the liquid to the level of said opening, a carrier for said receiver provided with a rack, a gear meshing with said rack, and a handle for rotating said gear to adjust the carrier and vary the elevation of the receiver in said container.

9. Apparatus for measuring liquid, comprising, in combination, a container for measuring successive charges of liquid by volume, inlet and outlet valves for said container, a receiver in said container having an opening to allow liquid to overflow from said container into said receiver on rise of the liquid to the level of said opening, a carrier for said receiver provided with a rack, a gear meshing with said rack, a handle for rotating said gear to adjust the carrier and vary the elevation of the receiver in said container, and means cooperating with said carrier to hold the same in its different positions of adjustment.

10. Apparatus for measuring liquid, comprising, in combination, a container for measuring successive charges of liquid by volume, inlet and outlet valves for said container, a receiver having an opening to allow liquid to overflow from said container into said receiver on rise of the liquid to the level of said opening, a carrier for said receiver including a pair of slide bars provided with opposed racks, a counterbalance weight on one of said bars, and a gear meshing with said racks for rotation to vary the elevation of the receiver in said container.

11. An apparatus of the character described, comprising, in combination, a container for measuring successive charges of liquid by volume, a pipe for delivering the liquid into the container through the upper end thereof, an inlet valve for said pipe, an outlet valve for said container, and means for automatically closing the inlet valve on entrance of a charge of predetermined volume into said container and having means for compensating for the increment flowing from the valve through the pipe into the container after closure of the inlet valve.

12. Apparatus for measuring liquid, comprising, in combination, a container for measuring successive charges of liquid by volume, a pipe for conducting the liquid into said container at a point above the bottom of the container, an inlet valve for said pipe, means for closing the inlet valve, and electrical control means for said closing means having means for rendering said closing means effective on entrance of a charge of predetermined volume into said container, said electrical control means having means for compensating for the increment in the pipe flowing into the container after closure of the inlet valve.

13. Apparatus for measuring liquid, comprising, in combination, a container, a pipe for conducting the liquid into said container at a point above the base of the latter, an inlet valve for said pipe, means for closing the inlet valve, and electrical control means for rendering said closing means effective to close the valve comprising a circuit, a pair of contacts adapted to be submerged by the liquid on rise of the latter to predetermined level, thereby to complete the electric circuit, one of said contacts being adjustable to compensate for the increment in the pipe flowing into the container after the closure of the inlet valve.

14. Apparatus for measuring liquid, comprising, in combination, a container for measuring successive charges of liquid by volume, an inlet valve for said container, a receiver mounted in said container at a predetermined elevation and having an opening to allow liquid to flow from said container into said receiver on rise of the liquid to said opening, thereby to determine the volume of the charge measured, and means automatically to close the inlet valve on rise of the liquid to said opening.

15. Apparatus for measuring liquid, comprising, in combination, a container for measuring successive charges of liquid by volume, inlet and outlet valves for said container, a receiver having an opening to allow liquid to flow from the container into the receiver on rise of the liquid to the level of the opening, thereby to determine the volume of the charge of liquid, and a valve in said receiver operable to deliver the overflow liquid from the receiver into the container, thereby to contribute to a succeeding charge of liquid.

In testimony whereof, I have signed my name to this specification.

THOMAS J. STURTEVANT.